(12) United States Patent
Gerharz et al.

(10) Patent No.: US 11,427,485 B2
(45) Date of Patent: Aug. 30, 2022

(54) DISINFECTANT COMPOSITION

(71) Applicant: LANXESS Deutschland GmbH, Cologne (DE)

(72) Inventors: Tanja Gerharz, Solingen (DE); Mark Wallace Squire, Suffolk (GB)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 15/734,014

(22) PCT Filed: May 27, 2019

(86) PCT No.: PCT/EP2019/063652
§ 371 (c)(1),
(2) Date: Dec. 1, 2020

(87) PCT Pub. No.: WO2019/228980
PCT Pub. Date: Dec. 5, 2019

(65) Prior Publication Data
US 2021/0221713 A1  Jul. 22, 2021

(30) Foreign Application Priority Data

Jun. 1, 2018 (EP) .................................... 18175577

(51) Int. Cl.
*C02F 1/50* (2006.01)
*C02F 103/22* (2006.01)

(52) U.S. Cl.
CPC ............ *C02F 1/50* (2013.01); *C02F 2103/22* (2013.01); *C02F 2303/04* (2013.01)

(58) Field of Classification Search
USPC .......................... 210/764; 424/405; 119/200
See application file for complete search history.

(56) References Cited

U.S. PATENT DOCUMENTS

| | | | |
|---|---|---|---|
| 3,873,696 A * | 3/1975 | Randeri | A61L 12/08 424/680 |
| 4,404,191 A * | 9/1983 | Sporkenbach | A01N 59/02 424/613 |
| 4,822,512 A * | 4/1989 | Auchincloss | A01N 59/00 424/613 |
| 5,514,287 A * | 5/1996 | Jones | C02F 1/76 210/753 |
| 5,732,653 A | 3/1998 | Yamine | |
| 6,409,926 B1 * | 6/2002 | Martin | C02F 1/76 210/709 |
| 6,727,219 B2 * | 4/2004 | Buckland | A01N 59/02 510/367 |
| 7,090,820 B2 * | 8/2006 | Martin | C01B 15/08 252/186.27 |
| 10,383,894 B2 * | 8/2019 | Tran | A61P 19/02 |
| 2005/0062017 A1 * | 3/2005 | Martin | C01B 15/08 252/186.1 |
| 2006/0078584 A1 * | 4/2006 | Lightcap | C02F 1/722 424/405 |
| 2019/0002819 A1 * | 1/2019 | Heffron | C11D 3/381 |
| 2019/0335756 A1 * | 11/2019 | Gupta | C02F 1/722 |

FOREIGN PATENT DOCUMENTS

| | | | |
|---|---|---|---|
| CN | 102835424 A | 12/2012 | |
| EP | 1682455 B1 * | 7/2013 | ............... C02F 1/76 |
| GB | 2292888 A1 | 3/1996 | |
| WO | 0167864 A2 | 9/2001 | |
| WO | 07023481 A1 | 3/2007 | |
| WO | 08040987 A2 | 4/2008 | |

OTHER PUBLICATIONS

European Search Report from corresponding European Application No. 18175577, dated Jul. 30, 2018, three pages.

* cited by examiner

*Primary Examiner* — Nina Bhat
(74) *Attorney, Agent, or Firm* — Nicanor A. Kohncke; Christopher L. McDavid; Ewa M. Wozniak

(57) ABSTRACT

A disinfectant composition useful in shrimp aquaculture and a process for using such a disinfectant, in which there is a composition containing
a) 25 to 87 wt. % of $KHSO_5$ containing triple salt
b) 1 to 20 wt. % of at least one $H_2N(CH_2)_nSO_3H$ compound with n being 0, 1, 2 or 3,
c) 1 to 8 wt. % of a surfactant
d) 1 to 60 wt. % of a $C_2$-$C_{10}$ aliphatic dicarboxylic acid, optionally substituted with a hydroxyl and/or carboxylic group and
e) 10 to 30 wt. % alkali metal phosphate.

12 Claims, No Drawings

DISINFECTANT COMPOSITION

The present invention relates to a disinfectant composition in particular for the shrimp aquaculture and a respective process for using such a disinfectant.

The intensification of shrimp production around the world has increased the risk shrimp diseases in part due to high stocking densities, feeding rates that lead to poor water quality, the continued use of antibiotics, chemicals, and marginally performing antimicrobials, and inadequate biosecurity measures.

Pacific white shrimp (*Litopenaeus vannamei*) is nowadays the most important shrimp species for aquaculture, replacing Giant Tiger Prawn (*Penaeus monodon*) and Chinese white shrimp (*Penaeus chinensis*) as widely cultured farmed prawns.

Lots of chemicals and antibiotics have been used in shrimp culture industries to control the problem of infectious diseases. Some of them have negative effect to consumer, therefore, less antibiotic and chemicals have been using in shrimp culture in the past few years. However, some chemicals still need to use in the culture system such as disinfectant.

Beyond many disinfectants based on different chemical actives that have been used for that purpose, potassium monopersulphate based disinfectants are known which are effective against a wide range of viral and bacterial fish and shrimp pathogens which ensure food safety. Some are known to be effective against the WHO listed notifiable crustacean White Spot disease (caused by White Spot Syndrome Virus (WSSV)). Water disinfectants, like Virkon™ Aquatic from Lanxess, are well suited to prevent and control the spread of shrimp diseases, especially White Spot Disease, as part of a robust biosecurity program. Beside WSSV some can control also the other most common shrimp disease-causing organisms like Taura Syndrome (caused by Taura Syndrom Virus), Vibriosis (caused by *Vibrio* spp.), Luminescent Disease/Vibriosis (caused by *Vibrio harveyi*), Early Mortality Syndrome (EMS) and Acute Hepatopancreatic Necrosis Syndrome (AHPNS) (both caused by *Vibrio parahaemolyticus*).

The potassium monopersulphate based disinfectants work also in different ponds water quality conditions e.g. high salinity for instance in an amount of 20-25 ppt (=20-25 g salt/kg water, ppt is the unit for salinity, part per thousand), high organic load and different temperature.

In CN 102835424 for instance a composition containing single potassium monopersulphate and beside other components also 4 to 10 wt % of a berberine extract which is a yellow quaternary ammonium compound which however is not desired for aquatic purposes.

Also disinfectants based on potassium monopersulphate not having the disadvantage of containing quaternary ammonium like Virkon® Aquatic from Lanxess are known for aquatic purposes, in particular for shrimp disease management. Even though such products are mainly recommended for being used for shrimps of higher age, its use for younger shrimps can still be improved.

Hence, it was an object of the present invention to provide a disinfectant composition that has improved properties in particular for shrimps of the age of 1 to 27 days, after hatching, in particular in the stage from being Nauplii up to the PL-15 phase.

Hence, the present invention provides a composition containing
a) 25 to 87 wt. % of $KHSO_5$ containing triple salt
b) 1 to 20 wt. % of at least one $H_2N(OH_2)_nSO_3H$ compound with n being 0, 1, 2 or 3,
c) 1 to 8 wt. % of a surfactant
d) 1 to 60 wt. % of a $C_2$-$C_{10}$ aliphatic dicarboxylic acid, optionally substituted with a hydroxyl and/or carboxylic group and
e) 10 to 30 wt. % alkali metal phosphate.

The given amounts are each based on the composition respectively.

Component a)

The $KHSO_5$ containing triple salt represents a mixture of the salts $KHSO_5$, $KHSO_4$, and $K_2SO_4$, preferably in form of the formula $2KHSO_5 \cdot KHSO_4 \cdot K_2SO_4$, and is available for example under the name Oxone® monopersulphate.

Component b)

The composition comprises preferably as component b) at least one $H_2N(CH_2)_nSO_3H$ compound with n being 0 and the compound is sulphamic acid. Alternatively a preferred embodiment n being 2 and the compound is taurine.

Component c)

Any surfactant compatible with the acids and oxidizing agents can be utilized. A particularly effective surfactant is an alkali metal $C_4$-$C_{20}$-alkylarylsulphonate, in particular alkali metal $C_{10}$-$C_{13}$-alkylbenzene sulphonate, more preferred the respective sodium sulphonate. Other suitable surfactants include lauryl ether sulphates, ethylene oxide/propylene oxide alkyl phenol condensates, polyglycol ethers of fatty alcohols, fatty acid ethylene oxide condensates, polyglycol ethers of alkyl phenols, and fatty alcohol ethoxylates.

Component d)

The preferred $C_2$-$C_{10}$-aliphatic dicarboxylic acid, in particular $C_4$-$C_6$-aliphatic dicarboxylic acid that is unsubstituted or substituted by one or more hydroxyl and/or carboxylic group is in particular selected from the group consisting of malic acid, citric acid, succinic acid, adipic acid, maleic acid and tartaric acid, most preferred is malic acid.

Component e)

Preferred is the component e) is an anhydrous alkali metal phosphate. The alkali metal phosphate may be sodium hexametaphosphate, also known as sodium polyphosphate. Other phosphates, which can be used to replace all or part of the sodium hexametaphosphate, include tetrasodium pyrophosphate, mono-, di- and tri-sodium phosphate, and the corresponding potassium compounds.

The phosphates act as buffering and chelating agents, in combination with the flat pH curve of the component b) like sulphamic acid, and enable the composition to be effective over a wide range of in-use conditions, for example, the composition can be dissolved in hard water and even in sea water without deleteriously affecting its virucidal properties. Preferred component e) is sodium meta phosphate.

Further Ingredients

The composition may also contain further ingredients in particular free flowing agents, preferably in an amount of 0 to 10 wt. %, more preferably 0 to 5 wt. %, in particular 0 to 1 wt. %.

As free flowing agents preferably silica based components, in particular fumed silica is used, preferably in an amount of 0 to 0.5 wt. %.

The Composition as Such

In a preferred embodiment the composition of the present invention contains
a) 35 to 72 wt. % of $KHSO_5$ containing triple salt,
b) 2 to 10 wt. % of at least one $H_2N(CH_2)_nSO_3H$ compound with n being 0, 1, 2 or 3, c) 1 to 6 wt. % of a surfactant,
d) 15 to 30 wt. % of a $C_2$-$C_{10}$ aliphatic dicarboxylic acid, optionally substituted with a hydroxyl and/or carboxylic group and
e) 10 to 20 wt. % alkali metal phosphate.

In a further preferred embodiment the composition contains
a) 40 to 67 wt. % of $KHSO_5$ containing triple salt,
b) 2 to 10 wt. % of at least one $H_2N(CH_2)_nSO_3H$ compound with n being 0, 1, 2 or 3,
c) 1 to 6 wt. % of a surfactant,
d) 20 to 30 wt. % of a $C_2$-$C_{10}$ aliphatic dicarboxylic acid, optionally substituted with a hydroxyl and/or carboxylic group and
e) 10 to 20 wt. % alkali metal phosphate.

The composition preferably contains the components a) to e) in a total amount of 90 to 100 wt. %, more preferred in an amount of 95 to 100 more wt. %, in particular in an amount of 99 to 100 wt. %.

In a preferred embodiment, the composition of the present invention beyond the $KHSO_5$ containing triple salt does contain any other peroxy compound in an amount of 0 to 0.5 wt. %, preferably 0 to 0.2 wt. %, in particular no such compound.

Also preferred is the composition of the present invention having an amount of quaternary ammonium compounds of not more than 0.5 wt. %, means from 0 to 0.5 wt. % preferably from 0 to 0.2 wt. %.

The composition of the present invention is preferably solid at room temperature. Also preferred is the pH of a 1 percent by weight aqueous solution of the composition of the present invention being in the range of 1.2 and 5.5, in particular of 1.5 to 2.8.

The disinfectant composition used in this invention can kill various kind of pathogens especially *Vibrio parahaemolyticus* or *Vibrio harveyi*. This invention shows the toxic effect of a disinfectant on various stages of white shrimp.

The disinfectant composition of present invention is directed to the above problems of water disinfectants provide an aquaculture ponds and can effectively kill pathogenic microorganisms in the main, and has no adverse effects on breeding animals, and no residue of aquaculture ponds disinfectant products as well as a very low toxicity, Preparation of the Composition The invention refers also to a process for manufacturing of the composition of the present invention, wherein the components a) to e) and optionally further used components are blended.

Use for Disinfection

The invention also relates to a process for disinfecting water to be used for cultivation or containing aquatic shrimp cultures wherein a composition of the present invention is added to the water either directly or in form of an aqueous solution.

The dosing of an aqueous form of the composition of the present invention may also be possible and for this a concentrate of preferably 2 to 20 wt. % composition in water is preferred.

Amount

The treatment of the water, in particular in a hatchery, nursery or grow-out pond is preferably done with 1 to 15 ppm, in particular 2 to 5 ppm of the disinfection composition of the present invention. More preferably, at least two portions of the disinfection composition of the present invention are introduced into the water, with an interval of from 5 to 10 days between respective additions thereof.

The composition may be added to the water either before or during the stay of aquatic shrimp cultures, if the addition is done before any aquatic shrimp cultures in any stage of their life cycle are added, the cultures will be added shortly after the water treatment, in particular within 12 to 24 hours thereafter.

Preferably the composition is added while the aquatic shrimp cultures are contained in the water.

Aquatic Cultures

Preferred aquatic cultures are shrimp cultures, in particular the shrimp *Litopenaeus vannamei* or *Litopenaeus setiferus*, *Litopenaeusstylirostris*, *Litopenaeus aztecus*, *Litopenaeus chinesis*, *Litopenaeus duorarum*, *Penaeus japonicas*, and *Penaeus monodon* (Black Tiger shrimps).

The treatment according to the present invention has a very good effect for shrimps in particular for shrimps of the age of 1 to 27 days, after hatching, in particular in the stage from being Nauplii up to the PL-15 phase, including the stages Nauplii, Protozoea/Zoea, Mysis and post Larvae.

The water treatment with the composition of the present invention can certainly also be done during the later growing stages of the aquatic shrimp cultures.

It has surprisingly found that in particular for the very young shrimp individuals the toxic doses determined as LC50 values has been reduced substantially compared to other monopersulphate containing disinfection agents.

Below, the invention will be elucidated on the basis of the following examples and comparative experiments, without being limited thereto.

EXAMPLES

Composition 1 of the Present Invention Used in the Examples:

| component | Amount [wt. %] |
| --- | --- |
| a) $KHSO_5$ containing triple salt (Oxone ® monopersulphate) | 49.8 |
| Sodium chloride | 1.5 |
| b) Sulohamic acid | 4.6 |
| d) Malic acid | 24 |
| e) Na-hexametaphosphate | 14.9 |
| c) Sodium $C_{10}$-$C_{13}$-alkylbenzene sulphonate (Marion ® ARL) | 4.9 |
| Fumed silica (Cabosil ® M5) | 0.3 |
| Total | 100 |

Comparison Composition 1: Composition of the Prior Art (Virkon® Aquatic):

| Component | Amount in composition [wt. %] according to measurement | Amount in composition [wt. %] according to MSDS |
| --- | --- | --- |
| a) Potassium peroxymonosulphate triple salt | 49.75 | 25 to 50* |
| e) Na-hexametaphosphate | 21.9 | — |

-continued

| Component | Amount in composition [wt. %] according to measurement | Amount in composition [wt. %] according to MSDS |
|---|---|---|
| c) Sodium $C_{10}$-$C_{13}$-alkylbenzenesulphonate | 13.7 | 10-<25** |
| d) Malic acid | 8.8 | <10 |
| b) Sulphamic acid | 4.4 | ≤5 |

*note
dipotassium peroxodisulphate and dipotassium disulphate are mentioned to be < 5 wt % each
**Sodium alkylbenzenesulphonate Comparison composition 2: Composition close to composition 1 of the present invention but with only 10 wt % surfactant as known from exp. 6 of WO2007/023481 for fish disinfection:

| component | Amount [wt. %] |
|---|---|
| a) $KHSO_5$ containing triple salt (Oxonee ® mono-persulphate) | 49.8 |
| Sodium chloride | 1.5 |
| b) Sulphamic acid | 4.6 |
| d) Malic acid | 24 |
| e) Na-hexametaphosphate | 9.8 |
| c) Sodium $C_{10}$-$C_{13}$-alkylbenzene sulphonate (Marlon ® ARL) | 10.0 |
| Fumed silica (Cabosil ® M5) | 0.3 |
| Total | 100 |

Toxicity Test of composition of the present invention to *Litopenaeus vannamei* Shrimp These test will be divided to three steps, preliminary test to predict the upper and lower level of LC50 concentration, lethal toxicity test to determine the concentration that killed 50% shrimp population, and sublethal toxicity test to determine the toxicity level that not kill the organism. Lethal toxicity test data will be analyzed with probit analysis to determine LC50 values in 24 and 96 hours exposure period, respectively. The stage of the shrimp that will be used in this trial will be Nauplius and PL (PL-15).

Objectives:

1. To study the toxicity levels of Disinfection composition of the present invention affected *L. vannamei* at different stages. Whereas Nauplius represent the youngest one which most sensitive to disinfectants and PL-15 which is more resistant than Nauplius. A more detailed classification of the respective stages can be found in the below table.

| Stage | Detail Stage | Days after hatching |
|---|---|---|
| Nauplius | N1-N6 | 0-2 |
| Protozoea/zoea | Z1-Z3 | 3-5 |
| Zoea Mysis | ZM | 5-6 |
| Mysis | M1-M3 | 6-10 |
| Mysis Post Larvae | MPL | 10-12 |
| Post Larvae | PL1-PL15 | 12-27 |

2. To define the safety margin of Disinfection composition of the present invention affected *L. vannamei* at different stages (Nauplius, and PL-15).

Materials and Method a. Toxicity Trial for Shrimp Nauplius
For this stage toxicity test should modified to 24 hours period, as in Nauplius only last for 24 hours then change to Zoea stage,
The test will be divided into two different steps.
i. Preliminary Test
1. The stage used was Nauplii N1-2.
2. Then, Nauplii were counted to have 130 animals into a well of a 20 well plates into 4 ml of sea water that the same with the salinity in hatchery (approximately 30 ppt=30 g salt/kg water, ppt is the unit for salinity, part per thousand).
3. Then, 1 ml of a 5% w/v solution of the disinfection composition 1 of the present invention was added to the well to make each well have 12 different concentration between 0 to 50 ppm (0 ppm, 0.5 ppm, 5 ppm, 10 ppm, 15 ppm, 20 ppm, 25 ppm, 30 ppm, 35 ppm, 40 ppm, 45 ppm and 50 ppm). No Replication used in this preliminary test.
4. The plates were incubated for 12 hours and shaken to provide aeration. After incubation, plates were observed under a stereoscope and dead animals were recorded.
5. Determine the highest concentration with 0% mortality and the lowest concentration with 100% mortality. The concentration will be the lower level and upper level of the test.
ii. Definitive Test
1. After the value of lower and upper level is found by preliminary test, divide the range between the value into 6 concentrations (for examples lower level=0 ppm and upper level=25 ppm, so the concentration will be 0 ppm, 1 ppm, 2 ppm, 4 ppm, 8 ppm, 16 ppm and 32 ppm)
2. Then, Nauplii were counted to have 130 animals into a well of a 6 well plates into 4 ml of sea water that the same with the salinity in hatchery (approximately 30 ppt).
3. Then, 1 ml of a 5% w/v solution of the disinfection composition of the present invention was added to the well to make each well have 12 different concentration between 0 to 50 ppm (0 ppm, 1 ppm, 2 ppm, 4 ppm, 7 ppm, 11 ppm, 16 ppm, 22 ppm, 29 ppm, 37 ppm, 46 ppm and 50 ppm). Each concentration is tested with 5 replications.
4. The plates were incubated for 24 hours and shaken to provide aeration. After incubation, plates were observed under a stereoscope and dead animals were recorded.
5. Analyze the result with the so called probit analysis to determined LC50 value.
b. Toxicity Trial for PL-15 Shrimp
PL-15 stage is selected to be tested because during this stage the shrimp gills will be developed completely usually this stage is the latter stage that send to grow out ponds. The test is be divided into two different steps.
i. Preliminary Test
1. PL-12 will get from nearby hatchery with proper biosecurity measurement and will be acclimatized through three days conditioning process in the lab with giving feeding regime normally with live feed/artemia and artificial feed. During acclimatization the shrimp will be reared in 500 L container and equip with 4 aeration system from 4 sir stones. Commercial feed with 10% of the body weight was given 3 times a day and live feed (artemia 20 artNaupli) 2 times a day.
2. After two days, count ten PL-15 of *L. vannamei* and put it in 5 aquarium (25×35×40 cm) filled up with sea water and equipped with aeration tools throughout the period.
3. Water quality will maintain to be stable with salinity 30 ppt, and water temperature between 28-30 degree Celsius.
4. Disinfection composition of the present invention will prepare 60 minutes before use and diluted with fresh water.
5. Prepare the experimental kit with concentration level of Disinfection composition of the present invention between 0 to 1000 ppm (the concentration will be 0 ppm, 1 ppm, 10 ppm, 100 ppm, 1000 ppm). No Replication used in this preliminary test.
6. Determine the highest concentration with 0% mortality and the lowest concentration with 100% mortality after 12 hours. The concentration will be the lower level and upper level of the test.

ii. Definitive Test
1. After the value of lower and upper level is found by preliminary test, divide the range between the value into 7 concentrations (for examples lower level=0 ppm and upper level=100 ppm, so the concentration will be 0 ppm, 10 ppm, 20 ppm, 40 ppm, 80 ppm, 100 ppm and 200 ppm).
2. Count Ten PL-15 of *L. vannamei* that already pass the 3 days conditioning phase and put it in 18 aquarium (25×35×40 cm) filled up with 10 Litres sea water and equipped with aeration tools throughout the period. Each concentration will have three replications.
3. Disinfection composition 1 of the present invention will prepare 60 minutes before use and diluted with fresh water and then apply directly to the tank to get the concentration
4. Water quality will maintain to be stable with salinity 30 ppt, and water temperature between 28-30 degree Celsius.
5. Take note of the PL rate of death hourly in the first 12 hours, then twelve hourly for 96 hours.
6. Analyze the test result to find out the concentration level that causes 50% of death rate of the PL within 96 hours.
7. Analyze the result with probit analysis to determined LC50 value.

Results:

Example 1: Present Invention

Lethal toxicity test to determine the concentration that killed 50% shrimp population, and sub-lethal toxicity test to determine the toxicity level that not kill the organism. Lethal toxicity test data analyzed with probit analysis to determine LC50 values in 96 hours exposure period. The stage of the shrimp that will be used in this trial will be Nauplii and post larval white shrimps at 15 days of age (PL-15) of white shrimp (*Litopenaeus vannamei*, Synonym *Penaeus vannamei*). Shrimp were exposed to a series of disinfectant concentrations for 24 h and 96 h, respectively.

A probit regression analysis was used to calculate standard $LC_{50}$ values and their 95% confidence limits.
a) Nauplius stage is selected because this is the first stage in hatchery process. For this stage toxicity test should modified to 24 hours period, as in Nauplius only last for 24 hours then change to Zoea stage.
b) PL-15 stage is selected to be tested because usually this stage is the latter age that send to grow out ponds.

Definitive test for a) Nauplii and b) PL15 respectively, the details are below:

Results: the mortality rates of 24 hours period for Nauplius and of 96 hours period the mortality rates for PL-15 a) Lethal concentrations for Nauplii

| LC* (%) | LC (ppm) | Minimum Dosages (ppm) | Maximum Dosages (ppm) |
|---|---|---|---|
| LC50 | 8.317 | 5.723 | 12.087 |
| LC85 | 21.532 | 14.817 | 31.291 |
| LC90 | 26.965 | 18.555 | 39.185 |

*LC is the abbreviation of lethal concentration. A LC50 is concentration of a substance which required to kill 50% of the tested population. The lower the LC50 value is the more toxic the substance is. A LC90 is concentration of a substance which required to kill 90% of the tested population.
**The minimum and maximum dosage is a 95% confidence interval, meaning that with 95% confidence the true value is within this interval.

b) Lethal concentrations for PL-15

| LC (%) | LC (ppm) | Minimum Dosages (ppm) | Maximum Dosages (ppm) |
|---|---|---|---|
| LC50 | 55.204 | 45.739 | 66.629 |
| LC85 | 71.635 | 59.352 | 86.459 |
| LC90 | 76.188 | 63.124 | 91.954 |

Comparison Composition 1:

Examples 1a) and 1b) were repeated but instead comparison composition 1 was used Results:

| Stages of *L. vannamei* | Example 1a) | Comparison composition 1 |
|---|---|---|
| | | LC50 (ppm) |
| Nauplius | 8.317 | 4.538 |
| PL-15 | 55.204 | 28.207 |

| Stages of *L. vannamei* | Example 1b) | Comparison composition 1 |
|---|---|---|
| | | 95% confidence interval |
| | | LC50 (ppm) |
| Nauplius | 5.723 | 4.222 |
| | 12.087 | 4.846 |
| PL-15 | 45.739 | 24.398 |
| | 66.629 | 32.099 |

Result:

Direct comparison of the lethal concentrations for *Litopenaeus vannamei* Nauplii of the composition 1 of the present invention and the comparison composition 1 shows that toxicity is decreased for the composition of the present invention. Direct comparison of the lethal concentrations for *Litopenaeus vannamei* PL-15 of the composition 1 of the present invention and the comparison composition 1 shows also a reduced toxicity. Hence, it was proven that with the present invention a disinfectant composition with improved properties in particular for shrimps of the age of 1 to 27 days, after hatching, in particular in the stage from being Nauplii up to the PL-15 phase was provided.

Comparison Composition 2:

Examples 1a) and 1b) were repeated but instead comparison composition 2 was used Results:

| Stages of *L. vannamei* | Example 1a) LC50 (ppm) | Comparison composition 2 LC50 (ppm) |
|---|---|---|
| Nauplius | 8.317 | 2.724 |
| PL-15 | 55.204 | 27.7005 |

| Stages of *L. vannamei* | Example 1b) LC50 (ppm) | Comparison composition 2 95% confidence interval LC50 (ppm) |
|---|---|---|
| Nauplius | 5.723 | 2.5632 |
|  | 12.087 | 2.8848 |
| PL-15 | 45.739 | 24.625 |
|  | 66.629 | 30.776 |

Result:

Direct comparison of the lethal concentrations for *Litopenaeus vannamei* Nauplii of the composition 1 of the present invention and the comparison composition 2 shows that toxicity is decreased for the composition of the present invention around 3 fold.

Direct comparison of the lethal concentrations for *Litopenaeus vannamei* PL-15 of the composition 1 of the present invention and the comparison composition 2 shows also a nearly 2 fold reduced toxicity. Hence, it was proven that with the present invention a disinfectant composition with improved properties in particular for shrimps of the age of 1 to 27 days, after hatching, in particular in the stage from being Nauplii up to the PL-15 phase was provided.

Hence, even the fish disinfection composition with lower amounts of surfactant than the Virkon® Aquatic product as known from WO 2007/023481 still shows a poor performance compared to compositions of the present invention.

FINAL CONCLUSION

The disinfectant presented in this invention relates to a disinfectant composition for the shrimp aquaculture and a respective process for using such a disinfectant showed that it can even be further improved with regard to toxicity over a similar commercial product available on the market as well as known fish disinfection compositions known in the prior art.

What is claimed is:

1. A process for disinfecting water to be used for cultivation or containing aquatic shrimp cultures comprising adding a composition to the water, wherein said composition comprises
    a) 25 to 87 wt. % of $KHSO_5$ containing triple salt;
    b) 1 to 20 wt. % of at least one $H_2N(CH_2)_nSO_3H$ compound with n being 0, 1, 2 or 3;
    c) 1 to 8 wt. % of a surfactant;
    d) 1 to 60 wt. % of a $C_2$-$C_{10}$ aliphatic dicarboxylic acid, optionally substituted with a hydroxyl and/or carboxylic group; and
    e) 10 to 30 wt. % alkali metal phosphate.

2. The process for disinfecting water according to claim 1, wherein the shrimps are aged 1 to 27 days after hatching.

3. A process for manufacturing a composition, said composition comprising
    a) 25 to 87 wt. % of $KHSO_5$ containing triple salt;
    b) 1 to 20 wt. % of at least one $H_2N(CH_2)_nSO_3H$ compound with n being 0, 1, 2 or 3;
    c) 1 to 8 wt. % of a surfactant;
    d) 1 to 60 wt. % of a $C_2$-$C_{10}$ aliphatic dicarboxylic acid, optionally substituted with a hydroxyl and/or carboxylic group; and
    e) 10 to 30 wt. % alkali metal phosphate,
    wherein the process comprises blending together components a) to e).

4. A composition comprising
    a) 25 to 87 wt. % of $KHSO_5$ containing triple salt;
    b) 1 to 20 wt. % of at least one $H_2N(CH_2)_nSO_3H$ compound with n being 0, 1, 2 or 3;
    c) 1 to 8 wt. % of a surfactant;
    d) 1 to 60 wt. % of a $C_2$-$C_{10}$ aliphatic dicarboxylic acid, optionally substituted with a hydroxyl and/or carboxylic group; and
    e) 10 to 30 wt. % alkali metal phosphate.

5. The Composition composition according to claim 4, wherein component b) comprises sulphamic acid.

6. The composition according to claim 4, wherein component d) comprises $C_4$-$C_6$-aliphatic dicarboxylic acid that is unsubstituted or substituted by one or more hydroxyl and/or carboxylic group.

7. The composition according to claim 4, wherein component d) comprises a aliphatic dicarboxylic acid selected from the group consisting of malic acid, citric acid, succinic acid, adipic acid, maleic acid and tartaric acid.

8. The composition according to claim 4, wherein component c) comprises an alkali metal $C_4$-$C_{20}$-alkylarylsulphonate.

9. The composition according to claim 4, wherein the composition contains
    a) 35 to 72 wt. % of $KHSO_5$ containing triple salt,
    b) 2 to 10 wt. %, of at least one $H_2N(CH_2)_nSO_3H$ compound with n being 0, 1, 2 or 3,
    c) 1 to 6 wt. % of a surfactant,
    d) 15 to 30 wt. % of a $C_2$-$C_{10}$ aliphatic dicarboxylic acid, optionally substituted with a hydroxyl and/or carboxylic group and
    e) 10 to 20 wt. % alkali metal phosphate.

10. The composition according to claim 4, wherein the composition contains
    a) 40 to 67 wt.% of $KHSO_5$ containing triple salt,
    b) 2 to 10 wt. %, of at least one $H_2N(CH_2)_nSO_3H$ compound with n being 0, 1, 2 or 3,
    c) 1 to 6 wt. % of a surfactant,
    d) 20 to 30 wt. % of a $C_2$-$C_{10}$ aliphatic dicarboxylic acid, optionally substituted with a hydroxyl and/or carboxylic group and
    e) 10 to 20 wt. % alkali metal phosphate.

11. The composition according to claim 4, wherein component d) comprises malic acid.

12. The composition according to claim 4, wherein component c) comprises alkali metal $C_{10}$-$C_{13}$-alkylbenzenesulphonate.

\* \* \* \* \*